(12) United States Patent
Plestid

(10) Patent No.: US 8,359,057 B2
(45) Date of Patent: Jan. 22, 2013

(54) PORTABLE ELECTRONICS DEVICE WITH PROGRAMMABLE BATTERY

(75) Inventor: Thomas Leonard Trevor Plestid, Kanata (CA)

(73) Assignee: Research In Motion Limited, Waterloo, Ontario (CA)

(*) Notice: Subject to any disclaimer, the term of this patent is extended or adjusted under 35 U.S.C. 154(b) by 474 days.

(21) Appl. No.: 12/551,795

(22) Filed: Sep. 1, 2009

(65) Prior Publication Data

US 2011/0053656 A1 Mar. 3, 2011

(51) Int. Cl.
*H04B 7/00* (2006.01)
(52) U.S. Cl. .............. 455/522; 455/127.1; 455/572; 455/573
(58) Field of Classification Search ............ 455/73, 455/500, 522, 571–574, 13.4, 127.1; 370/317, 370/318
See application file for complete search history.

(56) References Cited

U.S. PATENT DOCUMENTS

| | | | |
|---|---|---|---|
| 5,945,806 A | 8/1999 | Faulk | |
| 2002/0113493 A1 | 8/2002 | Morrow | |
| 2003/0071523 A1* | 4/2003 | Silverman | 307/150 |
| 2003/0228877 A1* | 12/2003 | Haapoja | 455/522 |
| 2004/0180686 A1* | 9/2004 | Nakayama | 455/522 |
| 2005/0046390 A1 | 3/2005 | Kimura | |
| 2006/0092583 A1 | 5/2006 | Alahmad et al. | |

FOREIGN PATENT DOCUMENTS

EP 1775852 4/2007

OTHER PUBLICATIONS

Yamashita et al., "A Novel Low-Power Dissipation and High-Speed Converter-Control-IC for the Transmitting Amplifier of Digital Portable Telephones", IEICE Transactions on Communications Society, Dec. 1, 1994, pp. 1600-1606, vol. E77-B, No. 12, Tokyo, Japan.
Sahu et al., "A High-Efficiency Linear RF Power Amplifier With a Power-Tracking Dynamically Adaptive Buck-Boost Supply", IEEE Transactions on Microwave Theory and Techniques, Jan. 1, 2004, pp. 112-120, vol. 52, No. 1, NJ, USA.
European Patent Office, Extended European Search Report for EP Patent App. No. 09169190.7, Feb. 5, 2010.
European Patent Office, Examination Report for EP Patent App. No. 09169190.7, Nov. 19, 2010.

* cited by examiner

*Primary Examiner* — Patrick Edouard
*Assistant Examiner* — Ronald Eisner
(74) *Attorney, Agent, or Firm* — Jeffrey W. Wong; Borden Ladner Gervais LLP

(57) ABSTRACT

A portable electronics device comprises at least one device subsystem, and a programmable battery. The programmable battery is coupled to a power input of the device subsystem and is configured to dynamically adjust a characteristic of the power that is applied to the power input in accordance with a power configuration command that is received at the battery.

4 Claims, 4 Drawing Sheets

PORTABLE ELECTRONICS DEVICE WITH PROGRAMMABLE BATTERY

FIELD

This patent application relates to a portable electronics device. In particular, this patent application relates to a portable communications device powered by a battery array.

BACKGROUND

Many battery-operated portable communications devices, such as wireless telephones, personal data assistants, and wireless pagers, include a RF power amplifier which facilitates communication over a wireless network. The communication protocol implemented by the wireless network usually requires the communication device to adjust the RF power output of the amplifier in accordance with a variety of characteristics, including maximum/minimum signal power thresholds and power control level commands transmitted by the network.

To facilitate required adjustments in RF output power, typically the communications device includes a DC/DC converter that is connected to the battery and the power amplifier. Based on the network power threshold/level commands, the DC/DC converter adjusts the RF output power by varying the DC bias that is applied to the power amplifier. However, the conversion from battery voltage to amplifier bias voltage is inefficient. As a result, much of the available battery capacity is not converted to useful work but is, instead, wasted as heat.

BRIEF DESCRIPTION OF THE DRAWINGS

This patent application relates to a portable electronics device that includes a programmable battery that dynamically adjusts a characteristic of the power that is applied to a device subsystem in accordance with network power requirements.

This patent application also relates to a programmable battery for use with a portable electronics device, such as a wireless communications device. The programmable battery is configured to dynamically vary a characteristic of the power that is output from the battery based on a received power configuration command.

Figure 1:
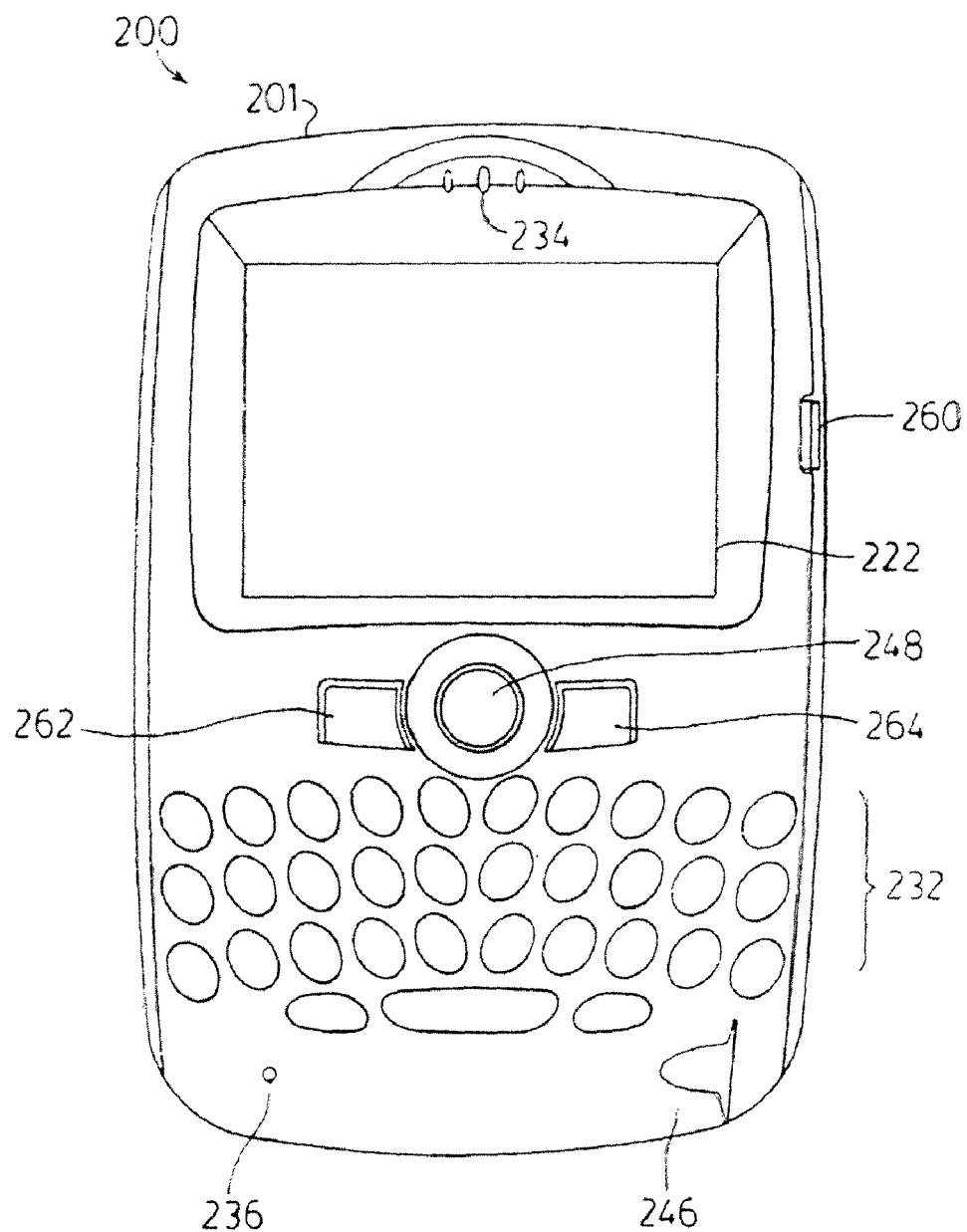
Figure 2:
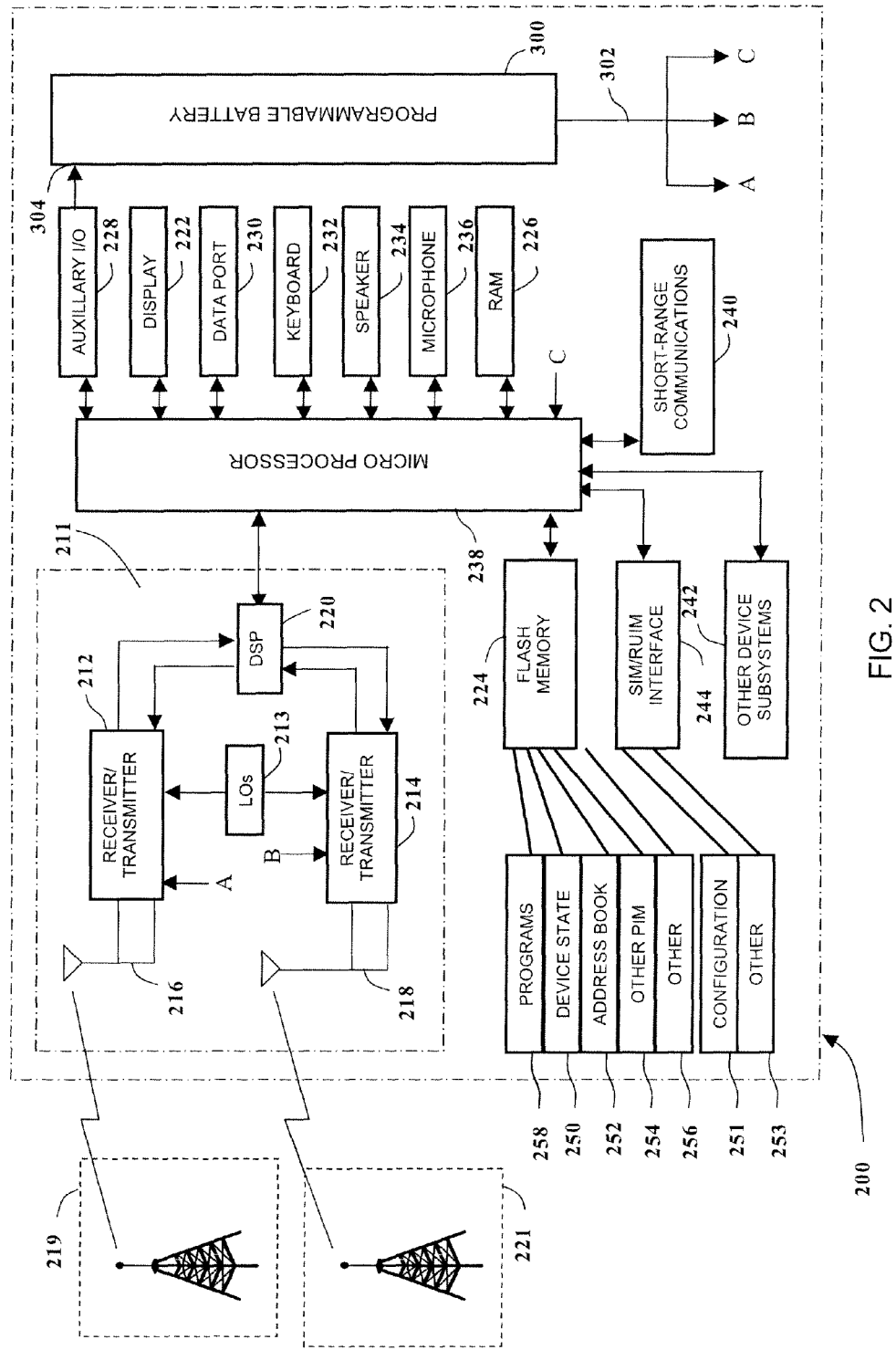
Figure 3:
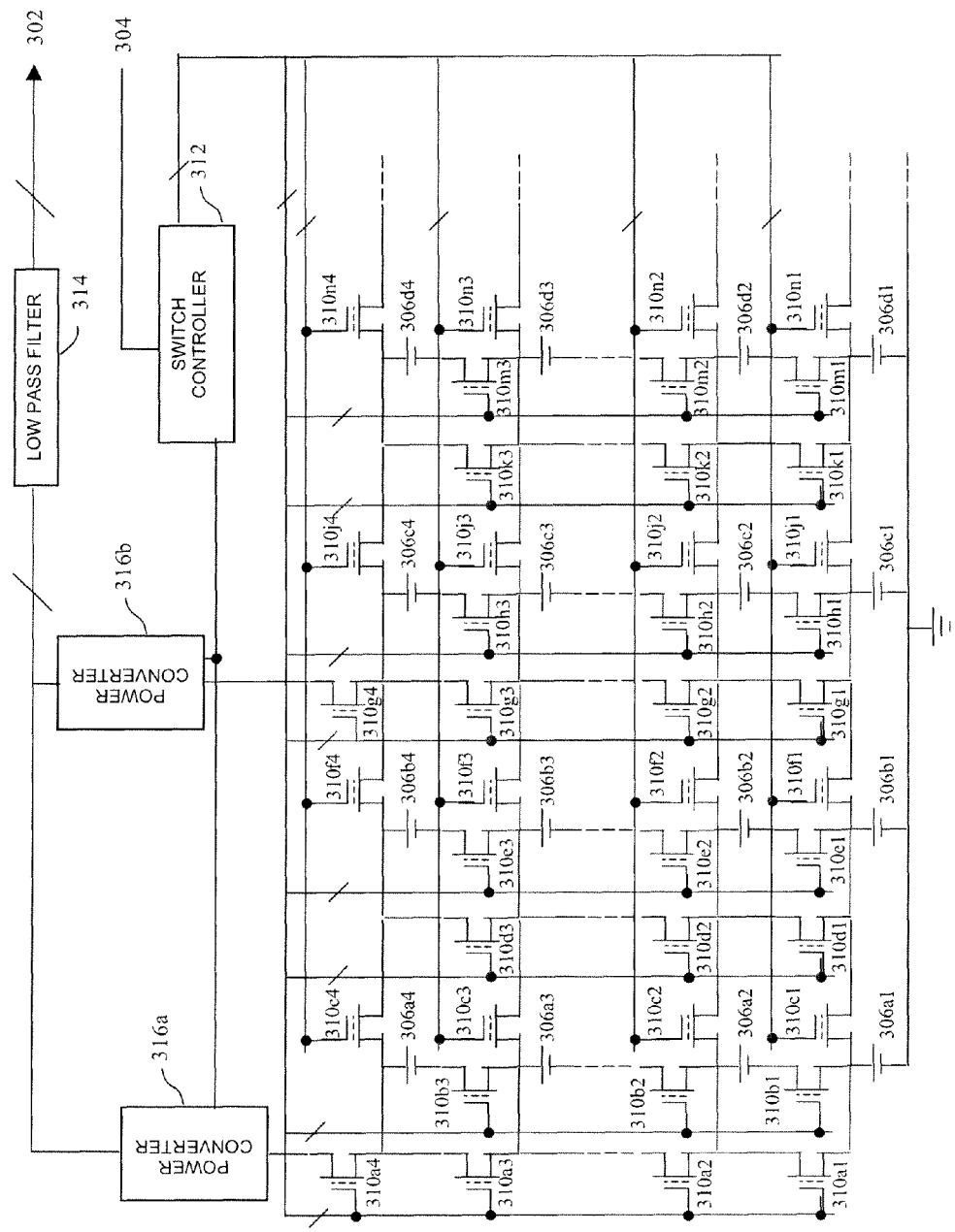
Figure 4:
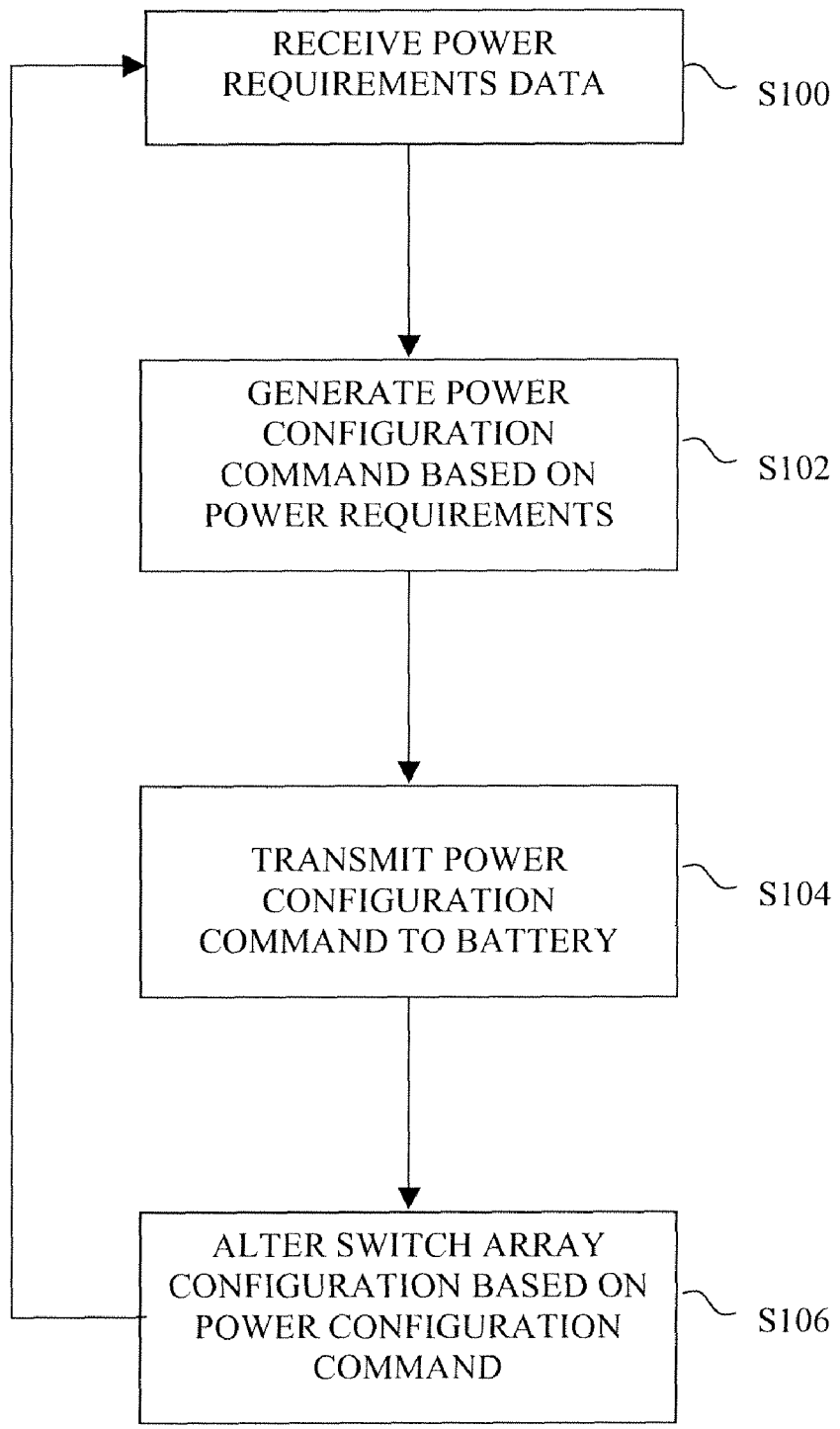

The portable electronics device and the programmable battery will be described in detail below, by way of example only, with reference to the accompanying drawings, in which:

FIG. 1 is a front plan view of a portable electronics device;

FIG. 2 is a schematic diagram depicting certain functional details of the portable electronics device, such as the communications subsystem and the programmable battery;

FIG. 3 is a schematic diagram depicting functional details of the programmable battery; and FIG. 4 is a flowchart that depicts the method of operation of the programmable battery.

DETAILED DESCRIPTION

As mentioned, in a first aspect this patent application describes a portable electronics device. As will be described in further detail below, the portable electronics device comprises at least one device subsystem, and a programmable battery. The programmable battery is coupled to the power input(s) of the device subsystem(s) and is configured to dynamically adjust a characteristic of the power that is applied to the power input(s) in accordance with a power configuration command received at the programmable battery.

One of the device subsystems may comprise a variable-gain power amplifier that has a gain input that determines the gain of the amplifier. In this implementation, the programmable battery is coupled to the gain input.

The portable electronics device may include a plurality of the device subsystems, and a power manager that is coupled to the device subsystems. In this implementation, the power manager may be configured to monitor the power requirements of the device subsystems and to issue the power configuration commands for each device subsystem in accordance with the monitored power requirements of each device subsystem.

The programmable battery of the portable electronics device may comprise a power output bus, an array of battery cells, a switch array, and a switch controller. The power output bus is coupled to the power input of each device subsystem. The switch array is coupled to the battery cells and the power output bus, and delivers power from the battery array to the power input(s). The switch controller is coupled to the switch array and is configured to deliver the power via the switch array to each device subsystem with the power characteristic(s) defined by the power configuration command(s).

The portable electronics device may be implemented as a wireless communications device. As will be described in further detail below, the wireless communications device may comprise a communication system, and a programmable battery. The communication system communicates with a wireless network, and comprises a gain input and is configured to vary the amplification of said communication in accordance with a magnitude of a voltage applied to the gain input. The programmable battery is coupled to the gain input and is configured to dynamically adjust the magnitude of the voltage applied to the gain input in accordance with the power requirement(s) of the wireless network.

In one implementation of the wireless communications device, the programmable battery comprises an array of battery cells, and a switch matrix that is coupled to the battery cells and the gain input. The switch matrix dynamically adjusts the voltage applied to the gain input from the battery array based on the network power requirement(s). Further, the communication system may receive power commands from the wireless network; and the switch matrix dynamically adjusts the gain input voltage in accordance with the power commands.

In this implementation, the switch matrix may comprise a switch array and a switch controller that is coupled to the switch array; with the switch controller dynamically adjusting the gain input voltage by varying a configuration of the switch array in accordance with the received power command. Further, the switch matrix may comprise a voltage converter that is coupled between the gain input and an output of the switch array; and the switch controller dynamically adjusts the gain input voltage by adjusting a gain of the voltage converter in accordance with the received power command.

The communication system may also comprise a variable-gain power amplifier, and a signal processor that is coupled to the variable-gain power amplifier. The gain input is coupled to the power amplifier. The communication may comprise a communication signal that is received at the power amplifier from the signal processor for wireless transmission over the wireless network. In this situation, the power amplifier varies the amplification of the communication signal by varying the gain of the power amplifier based on the gain input voltage. Alternately, the communication may comprise a wireless signal that is received at the power amplifier from the wireless network. In this latter situation, the power amplifier varies the amplification of the received wireless signal by adjusting the gain of the power amplifier based on the gain input voltage.

As mentioned, in a second aspect this patent application relates to a programmable battery for use with a portable electronics device, such as a wireless communications device. As will be described in further detail below, the programmable battery comprises an array of battery cells, a power output bus, and a switch matrix coupled to the battery cells and the output bus. The switch matrix is configured to dynamically vary a characteristic of the power applied to the power output bus from the battery array based on a power configuration command received at the battery.

In one implementation of the programmable battery, the switch matrix comprises a switch array and a switch controller that is coupled to the switch array. The switch controller is configured to receive the power configuration command and to dynamically vary the power characteristic by varying a configuration of the switch array in accordance with the received power configuration command. The programmable battery may also comprise a power converter (e.g. a DC/DC converter) that is coupled to an output of the switch array. The switch controller may be coupled to the power converter and configured to dynamically vary the power characteristic by varying a gain of the power converter in accordance with the received power configuration command.

In a third aspect, this patent application relates to a method for wireless communication using a wireless communications device. The communications device, according to the method, comprises a communication system that is configured for communication with a wireless network, and a programmable battery that is coupled to a gain input of the communication system. The method involves (1) the communications system receiving at least one power command from the wireless network indicative of at least one power requirement of the wireless network; (2) the communications system generating at least one power configuration command based on the at least one power command, and providing the programmable battery with the least one power configuration command; (3) the communication system receiving from the programmable battery a voltage at the gain input based on the least one power configuration command; and (4) the communication system varying an amplification of a communication signal at the communication system in accordance with a magnitude of the voltage applied to the gain input.

In one implementation of the method, the communication system comprises a variable-gain power amplifier that includes the gain input, and the method may involve receiving the communication signal at the communication system for wireless communication over the wireless network, whereupon the amplification varying comprises varying the gain of the power amplifier based on the gain input voltage. Alternately, the method may involve receiving the communication signal at the communication system from the wireless network, whereupon the amplification varying comprises varying the gain of the power amplifier based on the gain input voltage.

Communications Device 200

Turning now to FIGS. 1 and 2, there is shown a sample handheld communications device 200. Preferably, the handheld communications device 200 is a two-way wireless communications device having at least voice and data communication capabilities, and is configured to operate within a wireless cellular network. Depending on the exact functionality provided, the wireless handheld communications device 200 may be referred to as a data messaging device, a two-way pager, a wireless e-mail device, a cellular telephone with data messaging capabilities, a wireless Internet appliance, or a data communication device, as examples.

The handheld communications device 200 includes a data processing system (not shown), a communication subsystem 211, a display 222, a function key 246, a programmable battery 300, and various other device subsystems and electronics circuits all disposed within a common housing 201. The data processing system, the communication subsystem 211, the programmable battery 300 and the other device subsystems will be discussed in greater detail below. At this point, however, it is sufficient to point out that the data processing system is in communication with the various device subsystems and controls the overall operation of the device 200, and that the communication subsystem 211 allows the communications device 200 to communicate over a wireless network.

The programmable battery 300 provides power to the display 222, the communication subsystem 211, and the other electronic components of the handheld communications device 200. The programmable battery 300 also dynamically adjusts the characteristics of its output power based on power configuration commands that are received at the programmable battery 300. The power configuration commands may be issued to the programmable battery 300 from the communication subsystem 211, based on power commands (e.g. wireless signal power threshold and/or power control level commands) that are received by the communication subsystem 211 from the wireless network. Alternately, the power configuration commands may be issued to the programmable battery 300 based on the power requirements of the other device subsystems. As a result, the programmable battery 300 dynamically adjusts the characteristics of its output power based on the power requirement(s) of the wireless network and/or the device subsystems.

The display 222 may comprise a backlit liquid crystal display. The display backlight is configured to emit visible light to enhance the readability of information rendered on the display 222. In one implementation, the backlit display 222 comprises a transmissive liquid crystal display, and the function key 246 operates as a power on/off switch. Alternately, in another implementation, the backlit display 222 comprises a reflective or trans-reflective liquid crystal display, and the function key 246 operates as a front/backlight switch.

In addition to the data processing system, the communication subsystem 211, the display 222, the function key 246 and the battery 300, the handheld communications device 200 includes user data input devices, which the operator of the communications device 200 uses to input data to the device 200. As shown, the user data input devices include a keyboard 232, a trackball 248 and an escape key 260. The keyboard 232 includes alphabetic and numerical keys, and may also include a "Call" key 262 and an "End" key 264 to respectively initiate and terminate voice communication. However, the data input devices are not limited to these forms of data input. For instance, the data input devices may include a thumbwheel or other pointing device instead of (or in addition to) the trackball 248.

Communications Subsystem 211

FIG. 2 depicts functional details of the handheld communications device 200. The handheld communications device 200 incorporates a motherboard that includes various device subsystems, such as the communication subsystem 211 and the data processing system. The communication subsystem 211 performs communication functions, such as data and voice communications, and includes a primary transmitter/receiver 212, a secondary transmitter/receiver 214, a primary internal antenna 216 for the primary transmitter/receiver 212, a secondary internal antenna 218 for the secondary transmitter/receiver 214, one or more local oscillators (LOs) 213 and one or more digital signal processors (DSP) 220 coupled to the transmitter/receivers 212, 214.

Typically, the communication subsystem 211 sends and receives wireless communication signals over a wireless cellular network via the primary transmitter/receiver 212 and the primary internal antenna 216. Further, typically the communication subsystem 211 sends and receives wireless communication signals over a wireless local area network via the secondary transmitter/receiver 214 and the secondary internal antenna 218.

The primary internal antenna 216 can be configured for use within a Global System for Mobile Communications (GSM) cellular network or a Code Division Multiple Access (CDMA) cellular network. Further, the secondary internal antenna 218 can be configured for use within a WLAN WiFi (IEEE 802.11x) or Bluetooth network. Although the handheld communications device 200 is depicted in FIG. 2 with two antennas, it should be understood that the handheld communications device 200 may instead comprise only a single antenna, with a dual-band antenna being connected to both the primary transmitter/receiver 212 and the secondary transmitter/receiver 214.

Signals received by the primary internal antenna 216 from the wireless cellular network are input to the receiver section of the primary transmitter/receiver 212, which performs common receiver functions such as frequency down conversion, and analog to digital (A/D) conversion, in preparation for more complex communication functions performed by the DSP 220. Signals to be transmitted over the wireless cellular network are processed by the DSP 220 and input to transmitter section of the primary transmitter/receiver 212 for digital to analog conversion, frequency up conversion, and transmission over the wireless cellular network via the primary internal antenna 216.

Similarly, signals received by the secondary internal antenna 218 from the wireless local area network are input to the receiver section of the secondary transmitter/receiver 214, which performs common receiver functions such as frequency down conversion, and analog to digital (A/D) conversion, in preparation for more complex communication functions performed by the DSP 220. Signals to be transmitted over the wireless local area network are processed by the DSP 220 and input to transmitter section of the secondary transmitter/receiver 214 for digital to analog conversion, frequency up conversion, and transmission over the wireless local area network via the secondary internal antenna 218.

The communications device 200 also includes a SIM interface 244 if the handheld communications device 200 is configured for use within a GSM network, and/or a RUIM interface 244 if the handheld communications device 200 is configured for use within a CDMA network. The SIM/RUIM interface 244 is similar to a card-slot into which a SIM/RUIM card can be inserted and ejected. The SIM/RUIM card holds many key configurations 251, and other information 253 including subscriber identification information, such as the International Mobile Subscriber Identity (IMSI) that is associated with the handheld communications device 200, and other subscriber-related information.

In data communication mode, a received text message or web page download will be processed by the communication subsystem 211 and output to the display 222, or alternatively to the auxiliary input/output (I/O) subsystem 228. A user of the handheld communications device 200 may compose data items such as email messages for example, using the keyboard 232. Such composed items may then be transmitted over the wireless cellular network or the local area wireless network through the communication subsystem 211.

For voice communications, overall operation of the handheld communications device 200 is similar, except that received signals would preferably be output to the speaker 234 and signals for transmission would be generated by a microphone 236. Further, the display 222 may provide an indication of the identity of a calling party, the duration of a voice call, or other voice call related information for example.

The communication protocol implemented by the wireless cellular network and/or the wireless local area network may require the primary and/or secondary transmitter/receivers 212, 214 to adjust their respective RF output power levels in accordance with a variety of characteristics, including maximum/minimum signal power thresholds and power control level commands received from the network. Similarly, the DSP 220 may require the primary and/or secondary transmitter/receivers 212, 214 to adjust their respective gains to thereby increase the amplitude of the communication signals that are received from the wireless networks, prior to digital processing by the DSP 220.

To facilitate these adjustments, the primary and secondary transmitter/receivers 212, 214 each comprise a variable-gain power amplifier (not shown) coupled to the DSP 220. Each power amplifier includes a gain input (A, B) that is coupled to the programmable battery 300. The power amplifiers vary its gain/amplification (and therefore the RF output power level of the respective amplifier) based on the magnitude of the voltage that is applied to the gain input by the programmable battery 300. As a result, when the primary and secondary transmitter/receivers 212, 214 receive communication signals from the DSP 220, by varying the gain of the power amplifier the communication system is able to vary the amplification of the communication signals to meet the RF power level requirements for transmission over the wireless cellular network and the wireless local area network. Similarly, when the primary and/or secondary transmitter/receivers 212, 214 receive RF communication signals from the wireless cellular network and the wireless local area network, by varying the gain of the power amplifier the communication system is able to vary the amplification of the received communication signals to satisfy the signal level requirements for frequency down-conversion and A/D conversion.

Data Processing System

The data processing system interacts with the programmable battery 300, and the device subsystems such as the communication subsystem 211, the display 222, auxiliary input/output (I/O) subsystem 228, data port 230, keyboard 232, speaker 234, microphone 236, short-range communications subsystem 240, and device subsystems 242. The data port 230 may comprise a RS-232 port, a Universal Serial Bus (USB) port or other wired data communication port.

The data processing system comprises a microprocessor 238, flash memory 224, and volatile memory (RAM) 226. The flash memory 224 includes computer processing instructions which, when executed by the microprocessor 238, implement an operating system, computer programs, and operating system specific applications. The operating system comprises an Open Systems Interconnection (OSI) communication protocol stack that allows the handheld communications device 200 to send and receive communication signals over the wireless cellular network 219 and the local area wireless network 221. Alternately, the computer processing instructions may be copied from the flash memory 224 into the RAM 226 upon system reset or power-up, and executed by the microprocessor 238 out of the RAM 226.

The flash memory 224 includes both computer program storage 258 and program data storage 250, 252, 254 and 256. Computer processing instructions are preferably also stored in the flash memory 224 or other similar non-volatile storage. The computer processing instructions, when executed by the microprocessor 238 from the flash memory 224, implement an operating system, computer programs 258, and operating system specific applications. Alternately, the computer processing instructions may be copied from the flash memory 224 into the RAM 226 upon system reset or power-up, and executed by the microprocessor 238 out of the RAM 226. The computer processing instructions may be installed onto the handheld communications device 200 upon manufacture, or may be loaded through the cellular wireless network, the auxiliary I/O subsystem 228, the data port 230, the short-range communications subsystem 240, or the device subsystem 242.

The operating system comprises an Open Systems Interconnection (OSI) communication protocol stack that allows the handheld communications device 200 to send and receive information over the wireless cellular network and/or the local area wireless network. The operating system also allows the handheld communications device 200 to operate the display 222, the auxiliary input/output (I/O) subsystem 228, data port 230, keyboard 232, speaker 234, microphone 236, short-range communications subsystem 240, and device subsystems 242.

Typically, the computer programs 258 include communication software that allows the handheld communications device 200 to receive one or more communication services. For instance, preferably the communication software includes internet browser software, SMS message and e-mail software, telephone software and map software that respectively allow the handheld communications device 200 to communicate with various computer servers over the Internet, send and receive messages/e-mail, initiate and receive telephone calls, and view electronic maps. The computer programs 258 may also include application software, such as calendar software which diarizes due dates and/or appointments of importance to the user, and/or task management software which tracks of the status of tasks of importance to the user.

Preferably, the computer programs 258 also include a power management procedure (power manager). The operation of the power manager will be discussed in greater detail below. However, it is sufficient at this point to note that the power manager monitors the power requirements of the various device subsystems and electronic devices of the communications device 200, and generates and issues power configuration commands to the programmable battery 300 for each device subsystem and electronic device whose power consumption is being controlled by the power manager.

Some of these power configuration commands may be based on network requirements. For example, the power configuration commands may be based on (1) maximum/minimum signal power thresholds and/or power control level commands that are received at the communication subsystem 211 from the wireless networks, and/or (2) the transmit and/or receive signal strength of the wireless signals that are transmitted by or received at the communication subsystem 211.

Other power configuration commands may be based, directly or indirectly, on the actual or expected power requirements of the respective device. For instance, the power manager may be provided with a power requirements table that specifies the power requirements of various subsystems/devices for various load conditions or operating modes. This table may be stored in the flash memory upon manufacture, or may be loaded subsequently through an alternate source, such as the auxiliary I/O subsystem 228, the data port 230, the short-range communications subsystem 240, or the device subsystem 242. In this variation, the power manager may be configured to generate the power configuration commands based on the data provided in the power requirements table, and (1) the actual clock speed of the microprocessor 238, (2) the actual backlight level of the display 222, or (3) the volume of an audio signal that is required to be output by the speaker 234 upon the occurrence of a predefined event (e.g. audio notification of receipt of an e-mail or incoming phone call, or the occurrence of a calendar appointment).

It should also be understood that although the power manager is preferably implemented as a set of computer processing instructions, the power manager may be implemented in electronics hardware instead.

Programmable Battery 300

The programmable battery 300 supplies power to the various device subsystems and the electronic devices of the communications device 200, and dynamically adjusts the characteristics of that power in accordance with the power configuration commands that are received at the programmable battery 300.

To facilitate these adjustments, the programmable battery 300 includes a power output bus 302 that is coupled to power inputs of the device subsystems. For instance, the power output bus 302 may be coupled to the gain inputs of the power amplifiers of the primary and secondary transmitter/receivers 212, 214 of the communication subsystem 211. The power output bus 302 of the battery 300 may be coupled to the power supply inputs of other electronic devices of the communications device 200, such as the microprocessor 238 and the display 222. To allow the programmable battery 300 to adjust the power that the battery 300 supplies to the power inputs (gain inputs and the power supply inputs) of the subsystems/devices independently of each other, preferably the conductors of the power output bus 302 are each coupled to the power input of a respective device subsystem or electronic device of the communications device 200.

The programmable battery 300 also includes a command input 304 that is coupled to the auxiliary I/O subsystem 228. To allow the battery 300 to determine the subsystem/device for which a power configuration command has been issued, preferably the auxiliary I/O subsystem 228 includes a plurality of channels, each associated with a respective subsystem/device; and the power manager transmits the power configuration commands (to the programmable battery 300 over one of the channels of the auxiliary I/O subsystem 228) for the power control of the corresponding subsystem/device. The programmable battery 300 receives the power configuration commands from the power manager at the command input 304, via one of the channels of the auxiliary I/O subsystem 228, and dynamically adjusts the characteristics of the power that is supplied to the corresponding subsystem/device (via the power output bus 302).

For instance, in response to a change in (1) maximum/minimum signal power thresholds command and/or power control level commands that are issued by the wireless networks, and/or (2) the transmit/receive signal strength of wireless signals that are transmitted/received by the communication subsystem 211, the programmable battery 300 may receive a power configuration command from the power manager to adjust the transmit/receive power of the communication subsystem 211. In this event, the programmable battery 300 adjusts that voltage that it applies to the gain input of the power amplifiers of the primary and secondary transmitter/receivers 212, 214, based on these power configuration commands. Alternately, in response to a change in the backlight intensity of the display 222 or the clock speed of the microprocessor 238, the programmable battery 300 may receive a power configuration command to adjust the maximum current that the battery 300 is required to supply to the display 222 or the microprocessor 238.

FIG. 3 depicts a sample embodiment of the programmable battery 300, having two independent power outputs coupled to the power output bus 302. As shown, the programmable battery 300 comprises an array of battery cells and a switch matrix disposed within the housing of the programmable battery 300. The switch matrix delivers power from the battery array to the power output bus 302. The battery cell array may comprise a plurality of rechargeable battery cells (collectively referred to as battery cells 306), such as nickel cadmium cells, nickel metal hydride cells, or lithium ion cells, or a mixture of such cells. Alternately, the battery cell array may comprise a plurality of non-rechargeable battery cells 306.

The switch matrix is coupled to the battery cell array, to the power output bus 302 and to the command input 304, and is configured to dynamically adjust the voltage/current characteristics of the power that is applied to the power inputs of the various subsystems/devices that are coupled to the power output bus 302, from the battery cell array, based on the power configuration commands that the programmable battery 300 receives from the auxiliary I/O subsystem 228. The switch matrix comprises a switch array, and a switch controller 312 that is coupled to the switch array.

The switch array comprises a plurality of electronic switches (collectively referred to as electronic switches 310) that are coupled to the battery cells 306 and the power output bus 302, and delivers power from the battery array to the power inputs of the subsystems/devices. As shown, the electronic switches 310 interconnect the battery cells 306 in series with each other to form a plurality of series strings, and also interconnect the battery cells 306 into a plurality of parallel strings. Although the programmable battery 300 of FIG. 3 is shown comprising forty-two (42) electronic switches (310$a$1-310$n$4) and sixteen (16) battery cells (306$a$1-306$d$4) arranged as four strings, each comprising four series-connected battery cells, the programmable battery 300 is not limited to any particular number of battery cells, electronic switches, series strings, or battery cells per series string.

The parallel strings may be connected to the power output bus 302 of the programmable battery 300. However, preferably the switch matrix includes a very low pass filter 314 whose output is connected to the power output bus 302 of the programmable battery 300. The parallel strings may then be connected to the input of the very low pass filter 314. With this arrangement, the very low pass filter 314 can remove high frequency components of the power that is applied to the various subsystems/devices that are coupled to the power output bus 302.

Optionally, the switch matrix may also include first and second variable-gain power converters 316$a$, 316$b$ (collectively power converters 316), such as DC/DC voltage converters. Each power converter 316 includes a gain input that controls the gain of the power converter. As shown, in this arrangement the parallel strings are connected to the power inputs of the variable-gain power converters 316, and the power outputs of the power converters 316 are connected to the input of the very low pass filter 314. Since the output of the very low pass filter 314 is coupled to the power inputs of the subsystems/devices (via the power output bus 302), the power converters 316 are coupled at their outputs to the gain inputs of the primary and secondary transmitter/receivers 212, 214 (and the power supply inputs of the other device subsystems), and at their inputs to the output of the switch array.

Regardless of the configuration of the switch matrix however, the switch matrix is able to dynamically vary the characteristics (voltage and current) of the power that is delivered to the power output bus 302 of the programmable battery 300, from the battery array, based on the power configuration commands that are received at the programmable battery 300. Although the programmable battery 300 of FIG. 3 is shown comprising two power converters 316 and, therefore, two independent power outputs, the programmable battery 300 is not limited to any particular number of power converters or power outputs. Moreover, although the switch array, the switch controller 312, the very low pass filter 314 and the power converters 316 are all shown in FIG. 3 as being part of the programmable battery 300, one or more of these components may be provided within the communications device 200. For instance, in one variation, the switch array, the switch controller 312 and the power converters 316 is provided within the programmable battery 300, and the very low pass filter 314 is provided within a subsystem of the communications device 200.

The switch controller 312 is coupled to the command input 304 of the programmable battery 300, and to the electronic switches 310 of the switch matrix. The switch controller 312 receives the power configuration commands from the power manager (via the command input 304), and dynamically adjusts the characteristics of the power that is supplied to the corresponding device subsystem or electronic component via the switch array with the power characteristics defined by the received power configuration commands. As will be explained, the switch controller 312 varies the power characteristics by dynamically varying the configuration of the switch array in accordance with the received power configuration commands.

Further, if the switch matrix includes power converters 316, the switch controller 312 is coupled to the gain inputs of the power converters 316, and dynamically adjusts the characteristics of the power that is supplied to the subsystem/component by varying the configuration of the switch array and the gain of the power converters 314 in accordance with the power configuration commands. As a result, the switch controller 312 is able to facilitate the delivery of power from the battery array, via the switch array, with the power characteristic defined by the power configuration commands.

FIG. 4 is a flow chart that depicts the method of power control implemented by the handheld communications device 200. In the following example, each battery cell 306 is assumed to be rated at 1.0 VDC and 0.1 A, and the gain of each power converter 316 has a maximum range of between 0.5 and 1.5.

At step S100, the handheld communications device 200 may receive one or more power commands (e.g. maximum/minimum signal power thresholds) from the communication subsystem 211 via the wireless network indicative of the power requirements of the wireless network. These parameters are passed on to the power manager, via the DSP 220, for subsequent adjustment of the RF output power level of the communication subsystem 211. Alternately (or additionally), the power manager may be configured with a power requirements table that specifies the power requirements of the various subsystems/devices that are coupled to the power output bus 302 of the programmable battery 300.

Subsequently, at step S102, the power manager generates at least one power configuration command based on the at least one power command. Depending upon the implementation, the power command may require the communications device 200 to initiate wireless communication at a power level equal to the maximum signal power threshold. Therefore, the power manager may generate a power configuration command requiring the battery 300 to apply to the gain input of the power amplifiers of the primary and/or secondary transmitter/receiver 212, 214 a voltage of sufficient magnitude to thereby cause the RF output power level of the communication subsystem 211 to increase to the maximum signal power threshold.

At step S104, the power manager transmits the power configuration command to the programmable battery 300, using the channel of the auxiliary I/O subsystem 228 that is associated with the subsystem/device whose power requirements have changed. At step S106, the programmable battery 300 dynamically adjusts the voltage applied to the gain input based on the power configuration command, thereby causing the communication subsystem 211 to vary the amplification of a communication signal at the communication subsystem 211 in accordance with the magnitude of the voltage applied to the gain input.

The handheld communications device 200 may then initiate communication over one of the wireless networks, via the communication subsystem 211. For example, the communication subsystem 211 may receive a communication signal (e.g. from the microprocessor 238) for wireless transmission over the wireless network, in which case the communication subsystem 211 dynamically varies the gain of the power amplifiers of the primary and/or secondary transmitter/receiver 212, 214, based on the voltage applied to the gain input(s) from the programmable battery 300, to thereby meet the RF power level requirements for transmission over the wireless network. Alternately, the communication subsystem 211 may receive a communication signal from the wireless network, in which case the communication subsystem 211 dynamically varies the gain of the power amplifiers of the primary and/or secondary transmitter/receiver 212, 214, based on the voltage applied to the gain input(s) from the programmable battery 300, to thereby satisfy the signal level requirements for frequency down-conversion and A/D conversion.

To adjust the applied gain voltage, the switch controller 312 changes the configuration of the switch array in accordance with the power configuration command and the channel of the auxiliary I/O subsystem 228 over which the power manager transmitted the power configuration command. For instance, if the switch controller 312 received a power configuration command, at step S104, over the channel of the auxiliary I/O subsystem 228 that is associated with the communication subsystem 211, commanding the programmable battery 300 to output 4.0 VDC at 0.2 A, and the first power converter 316a was coupled to the gain input of one of the power amplifiers of the communication system 211 (via the power output bus 302), at step S106 the switch controller 312 could close electronic switches 310b1, 310b2, 310b3, 310e1, 310e2, 310c3, 310c1, 310c2, 310c3, 310c4, 310a4 of the switch array, and set the gain of the first power converter 316a to 1.0.

Alternately, instead of the communication subsystem 211 receiving power commands from the wireless network, the receiver/transmitters 216, 218 may provide the DSP 220 with received signal strength measurements of wireless communications that are received from the wireless networks. If the received signal strength drops below a minimum power threshold, at step S100 the DSP 220 may signal the power manager of the deficiency. In response, at step S102, the power manager may generate a new power configuration command requiring the battery 300 to increase the voltage applied to the gain input of one of the power amplifiers. The switch controller 312 would then make corresponding adjustments to the configuration of the switch matrix, at step S106, to thereby increase the gain of the associated receiver/transmitter 216, 218 to the specified level.

The foregoing process repeats continuously. Therefore, for example, at step S100, the wireless communications network may subsequently transmit a power control level command to the communications device 200, requiring the communications device 200 to reduce its RF output power level. In response, at step S102, the power manager may generate a new power configuration command requiring the battery 300 to reduce the voltage applied to the gain input of one of the power amplifiers. The switch controller 312 would then make corresponding adjustments to the configuration of the switch matrix, at step S106, to thereby cause the communication subsystem 211 to reduce its RF output power to the specified level. The handheld communications device 200 may then initiate communication over one of the wireless networks, via the communication subsystem 211.

Alternately, instead of the communication subsystem 211 receiving power commands or making signal strength measurements, at step S102 the power manager may generate a power configuration command based on a change in the operating mode/state (e.g. clock speed of microprocessor 238 or intensity of the backlight of the display 222) of one of the various subsystems/devices. For instance, the power manager may generate a power configuration command requiring the battery 300 to adjust the magnitude of the voltage and/or current of the power supplied to the subsystem/device whose operating mode/state has changed. At step S106, the programmable battery 300 would dynamically adjust the characteristics of the power applied to the power input of the device subsystem/component based on the power configuration command.

Again, to adjust the characteristics of the power applied to the device subsystem/component, the switch controller 312 changes the configuration of the switch array in accordance with the power configuration command and the channel of the auxiliary I/O subsystem 228 over which the power manager transmitted the power configuration command. For instance, if the switch controller 312 received a power configuration command, at step S104, over the channel of the auxiliary I/O subsystem 228 that is associated with the display backlight, commanding the programmable battery 300 to output 1.8 VDC at 0.4 A, and the second power converter 316b was coupled to the display backlight (via the power output bus 302), at step S106 the switch controller 312 could close electronic switches 310b1, 310e1, 310h1, 310m1, 310c1, 310c2, 310f1, 310f2, 310j1, 310j2, 310g2, 310g3, 310g4 and set the gain of the second power converter 316b to 0.9. If the programmable battery 300 was commanded to output 2.2 VDC at 0.4 A to the display backlight, the switch controller 312 could close the same electronic switches 310 as for 1.8 VDC at 0.4 A, but set the gain of the second power converter 316b to 1.1 instead of 0.9.

As will be apparent, with the foregoing method the number of battery cells 306 that are involved in the delivery of power to the various subsystems/devices may be based on the actual power requirements of the subsystems/devices. Further, the number of battery cells 306 that is used to deliver power varies substantially instantaneously as those power requirements change. As a result, the capacity of the programmable battery 300 that is wasted as heat (by the power amplifiers, for instance) is reduced, and the efficiency of the power transfer to the communications device 200 is increased.

The invention claimed is:

1. A wireless communications device comprising:
a communication system configured for communication with a wireless network, the communication system comprising a gain input and being configured to vary an amplification of said communication in accordance with a magnitude of a voltage applied to the gain input;
a power output bus; and
a programmable battery coupled to the gain input and being configured to dynamically adjust the magnitude of the voltage applied thereto in accordance with a power requirement of the wireless network and connected to the power output bus;
wherein the programmable battery provides outputs to the power output bus to power subsystems and devices coupled to the power bus; and
wherein at least one of the outputs is a power supply input for one of the subsystems and devices coupled to the power bus;
wherein the programmable battery includes an array of battery cells; and a switch matrix coupled to the battery cells and the gain input, the switch matrix being configured to dynamically adjust the voltage applied to the gain input from the battery array based on the network power requirement; and
wherein the communication system comprises a variable-gain power amplifier and a signal processor coupled to the power amplifier, the communication comprising a wireless signal received at the power amplifier from the wireless network, the power amplifier comprising the gain input and being configured to vary the amplification of the wireless signal by adjusting a gain of the power amplifier based on the gain input voltage.

2. The wireless communications device according to claim 1, wherein the communication system is configured to receive a power command from the wireless network, and the switch matrix is configured to dynamically adjust the gain input voltage in accordance with the power command.

3. The wireless communications device according to claim 1 wherein the switch matrix comprises a switch array and a switch controller coupled to the switch array, the switch controller being configured to dynamically adjust the gain input voltage by varying a configuration of the switch array in accordance with a power command received from the wireless network.

4. The wireless communications device according to claim 3, wherein the switch matrix further comprises a voltage converter coupled between the gain input and an output of the switch array, the switch controller being configured to dynamically adjust the gain input voltage by adjusting a gain of the voltage converter in accordance with the received power command.

* * * * *